(12) United States Patent
Radtke

(10) Patent No.: US 9,723,338 B2
(45) Date of Patent: Aug. 1, 2017

(54) MANAGEMENT OF MULTILINGUAL GRAPHICS FOR TELEVISION BROADCASTING

(71) Applicant: INSTITUT FUR RUNDFUNKTECHNIK GMBH, Munich (DE)

(72) Inventor: Benjamin Radtke, Essenheim (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 0 days.

(21) Appl. No.: 14/440,518

(22) PCT Filed: Nov. 5, 2013

(86) PCT No.: PCT/IB2013/059902
§ 371 (c)(1),
(2) Date: May 4, 2015

(87) PCT Pub. No.: WO2014/072899
PCT Pub. Date: May 15, 2014

(65) Prior Publication Data
US 2015/0288989 A1 Oct. 8, 2015

(30) Foreign Application Priority Data
Nov. 6, 2012 (IT) .............................. TO2012A0966

(51) Int. Cl.
*H04N 21/235* (2011.01)
*H04N 7/088* (2006.01)
(Continued)

(52) U.S. Cl.
CPC ......... *H04N 21/235* (2013.01); *G06F 17/289* (2013.01); *H04N 7/088* (2013.01);
(Continued)

(58) Field of Classification Search
CPC ........... H04N 21/488–21/4888; H04N 21/236; H04N 21/431; H04N 21/23614;
(Continued)

(56) References Cited

U.S. PATENT DOCUMENTS

2001/0030710 A1 10/2001 Werner
2005/0196147 A1* 9/2005 Seo ...................... G11B 27/105
386/243

(Continued)

FOREIGN PATENT DOCUMENTS

| WO | 97/18673 | 5/1997 |
|---|---|---|
| WO | 01/47286 A2 | 6/2001 |
| WO | 2011/146059 A1 | 11/2011 |

OTHER PUBLICATIONS

International Preliminary Report on Patentability and Written Opinion dated May 21, 2015, issued in PCT Application No. PCT/IB2013/059902, filed Nov. 5, 2013.

(Continued)

*Primary Examiner* — Michael Teitelbaum
(74) *Attorney, Agent, or Firm* — Workman Nydegger

(57) ABSTRACT

An apparatus (100) is proposed for inserting graphics into a television/video signal. The graphics generally includes text portions which are language-specific. For broadcasting the signal in at least two reception regions having different languages (DE, UK), differentiated graphics are therefore needed, which are inserted into the television/video signal in order to obtain the (at least) two television transmission signals to be broadcast in the (at least) two reception regions. For this purpose, the apparatus is provided with at least two text memories (118, 119), one for each one of the (at least) two different languages, for storing, for each graphics, text portions corresponding to each one of the (at least) two different languages, and at least two sub-circuits (renderers (Continued)

150, 152) for inserting the (at least) two graphics signals into the television signal.

7 Claims, 7 Drawing Sheets

(51) Int. Cl.
    *H04N 21/854*     (2011.01)
    *H04N 21/2187*     (2011.01)
    *G06F 17/28*     (2006.01)
    *H04N 21/242*     (2011.01)

(52) U.S. Cl.
    CPC ....... *H04N 7/0884* (2013.01); *H04N 21/2187* (2013.01); *H04N 21/2358* (2013.01); *H04N 21/242* (2013.01); *H04N 21/854* (2013.01)

(58) Field of Classification Search
    CPC ......... H04N 21/42653; H04N 21/4325; H04N 21/4622; H04N 5/445–5/44591; H04N 5/88715
    See application file for complete search history.

(56) References Cited

U.S. PATENT DOCUMENTS

| | | | |
|---|---|---|---|
| 2007/0089158 A1* | 4/2007 | Clark | H04N 7/17318 725/135 |
| 2008/0066138 A1 | 3/2008 | Bishop et al. | |
| 2008/0284910 A1 | 11/2008 | Erskine et al. | |
| 2010/0265397 A1 | 10/2010 | Dasher et al. | |
| 2012/0030182 A1* | 2/2012 | Claman | G11B 27/034 707/690 |

OTHER PUBLICATIONS

Search Report dated Jul. 25, 2013, issued in Italian Application No. TO2012A000966, filed Nov. 6, 2012.

International Search Report dated Feb. 27, 2014, issued in PCT Application No. PCT/IB2013/059902, filed Nov. 5, 2013.

* cited by examiner

MANAGEMENT OF MULTILINGUAL GRAPHICS FOR TELEVISION BROADCASTING

DESCRIPTION INTRODUCTION

The invention relates to an apparatus as set out in the preamble of the main claim, for inserting a graphics signal into a television signal. The invention also relates to a method as set out in the preamble of the method claim and to a software program for implementing said method.

Within the frame of the present invention, a "television signal" is meant to be a video signal (e.g., PAL, SECAM, NTSC, SDI, HD-SDI) as typically used for television broadcasting. This includes all broadcasting channels (satellite, cable, terrestrial, Internet).

An apparatus like the above-mentioned one is already available on the market, namely Viz Trio by VizRT, see www.vizrt.com.

DESCRIPTION OF THE INVENTION

The invention aims at greatly optimizing said apparatus known in the art. The on-screen graphics apparatus according to the present invention is characterized by the features set out in the characterizing part of the main claim. Advantageous embodiments are set out in claims dependent on claim 1. The method proposed by the present invention is characterized by the features set out in the method claim.

The invention is based on the following consideration.

When events take place during which a radio-television broadcaster makes available an "international" image in addition to the "national" one (e.g., football matches between national teams), two graphics designers create, independently of each other, specific graphics for the two transmission channels in the respective languages, i.e., (for example) one in German and one in English. Apart from being more subject to errors and needing double personnel, the method is problematical also because the filled graphics are made available at different times. A need has therefore arisen to handle multiple graphics renderers in a synchronous manner by means of a single controller device, by transferring those contents which are language-specific (e.g., texts in German and in English). No on-screen graphics apparatus previously known in the art allowed to attain this result.

The present invention proposes the use of an interactive controller (preferably a synchronous one) which allows superimposition of texts in different languages within the graphics, and which can handle the filling of templates, preferably synchronously, in a simpler and more accurate manner.

The on-screen graphics apparatus proposed by the present invention performs the following tasks:

1. "Action-based" control

The graphics is not selected from a long list of empty or pre-filled templates, as is the case in known apparatuses. The graphics designer can, in fact, choose the desired graphics in just one click while moving on a clear interface.

The contents (players' names and photos, team names and emblems, etc.) are entered ex ante into a sort of database. During transmission, access to said database can be gained in just a few clicks. All the information required for the selected graphics is collected automatically and transposed into said graphics.

2. Synchronous management of multiple graphics systems having "almost identical" contents Through a single control interface, one can manage multiple graphics systems. Names and photos are identical in both systems. All those texts which vary in the different languages (Gelbe Karte/yellow card, Torwart/goalkeeper, Wechsel substitution, . . . ) are transferred individually into each graphics system.

The output (start) and all other (continuous) trigger actions are carried out synchronously on both graphics systems.

The graphics designer's workload during the television transmission is independent of the number of computers being managed.

BRIEF DESCRIPTION OF THE DRAWINGS

The following description of the drawings will illustrate some examples of embodiment of the on-screen graphics apparatus proposed by the present invention.

DESCRIPTION OF THE DRAWINGS

Figure 1:
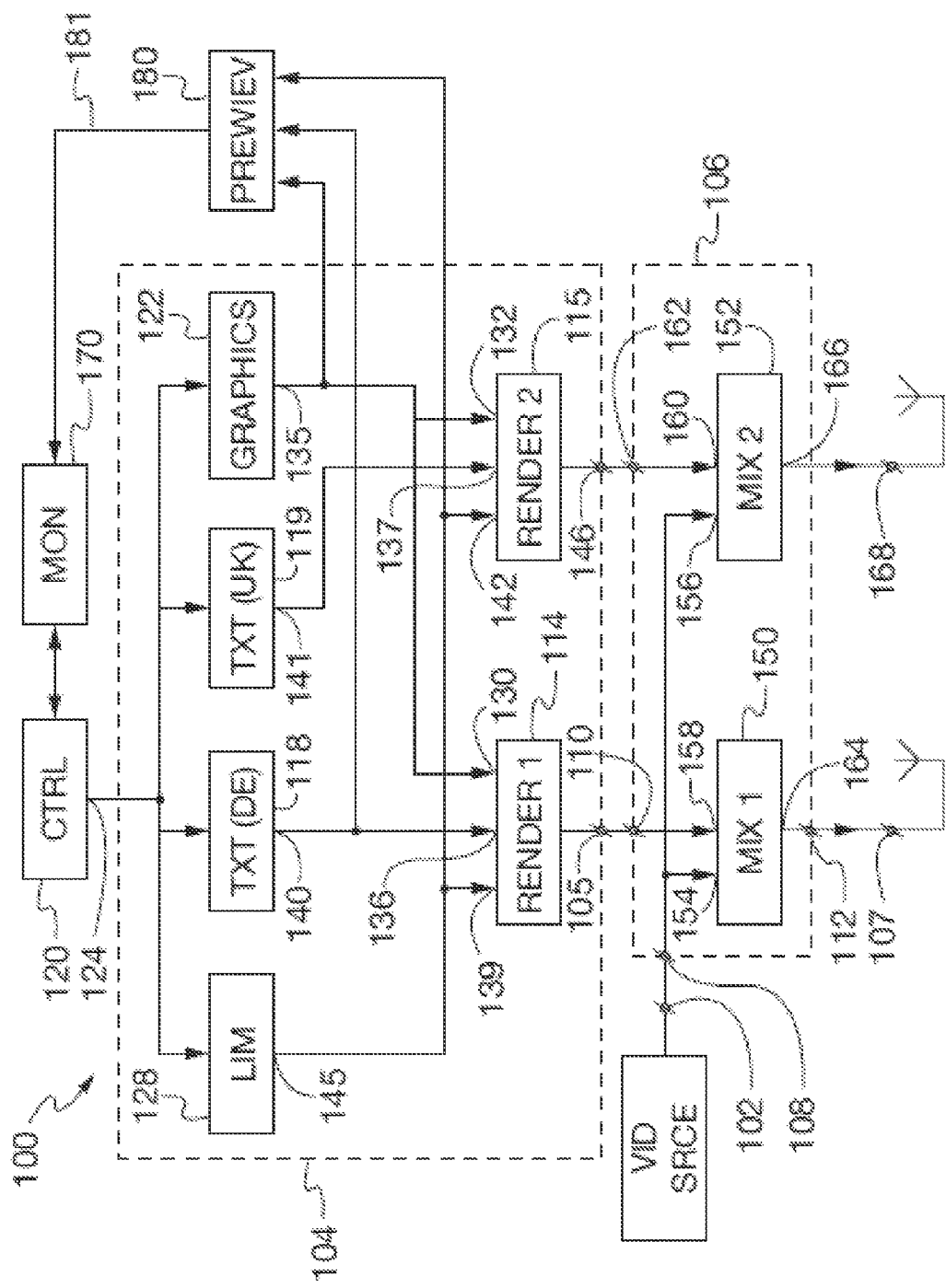
FIG. 1 schematically shows one example of embodiment of said apparatus.

FIG. 1 shows one example of embodiment of the on-screen graphics apparatus 100 according to the invention. Said apparatus 100 is adapted to insert graphics into a television signal, and is provided with an input 102 for receiving the television signal made available by a television signal source VIDSRCE. A graphics signal generator 104 is provided, which emits a graphics signal through an output 105. There is also a circuit 106 for inserting a graphics signal into the television signal. The television signal including the graphics signal is then made available at an output 107.

The circuit 106 is provided with a first input 108 associated with the input 102 of the apparatus 100 for receiving the television signal, a second input 110 associated with the output 105 of the graphics signal generator 104 for receiving the graphics signal, and an output 112 for supplying the television signal including the graphics signal, the output 112 being associated with the output 107 of said apparatus.

The on-screen graphics apparatus 100 is adapted to insert graphics into a television signal to be broadcast in at least two reception regions having different languages, e.g., a German-speaking reception region and an English-speaking reception region. The graphics to be inserted may comprise a text portion differentiated into the (at least) two different languages, referred to as TXT(DE) and TXT(UK) in FIG. 1.

At least two text memories 118 and 119 are included, one for each one of the (at least) two different languages, for storing text portions for each graphic, said text portions being differentiated into each one of the (at least) two different languages. A memory 128 is also provided. Said memory 128 stores further data, e.g., text portions which remain unchanged in the different languages, such as players' names and flags of national teams.

There is also provided a graphics memory 122 for storing various differentiated graphic environments (or templates), which will be illustrated below.

A first combining sub-circuit 114 (RENDER1) and a second combining sub-circuit 115 (RENDER2) are provided, which are adapted to generate the graphics signals required for the two languages based on the data contained in the memories 122, 118, 119 and 128.

To this end, a first input—130 and 132, respectively—of the two combining sub-circuits is associated with an output 135 of the graphics memory 122, a second input 136 of the combining sub-circuit 114 is associated with an output 140 of the first text memory 118, a second input 137 of the second combining sub-circuit 115 is associated with an output 141 of the second text memory 119, and a third input—139 and 142, respectively—of the two combining sub-circuits 114 and 115 is associated with an output 145 of the memory 128. In order to supply the (at least) two graphics signals including text portions in the (at least) two different languages, the outputs of the first combining sub-circuit 114 and of the second combining sub-circuit 115 are associated with the first output 105 and with a second output 146 of the graphics signal generator 104.

The circuit 106 is provided with at least a first sub-circuit 150 and a second sub-circuit 152. First inputs 154 and 156 of said two sub-circuits are associated with the input 108 of the circuit 106.

A second input 158 of the first sub-circuit 150 is associated with the second input 110 of the circuit 106, and the second input 160 of the second sub-circuit 152 is associated with a third input 162 of the circuit 106. The third input 162 of said circuit is associated with the second output 146 of the graphics signal generator 104. In order to supply the first and second television transmission signals, the outputs 164 and 166 of the first sub-circuit 150 and of the second sub-circuit 152 are associated with the first output 107 and with a second output 168 of the apparatus 100.

A circuit 120 is provided for generating a control signal in order to manage the various elements of the apparatus, for the purpose of generating the graphics signals and inserting them into the television signal as desired. There are also a circuit 180 for generating a preview and a screen (monitor) 170.

The graphics signals for the two languages are generated in the combining sub-circuits 114 and 115, as will be explained below. Subsequently, preferably substantially at the same time, the graphics signals are inserted into the television signal ("keying") by means of the sub-circuits 150 and 152: the graphics signal including the text portions in one language is inserted into the television signal in order to obtain a first television transmission signal to be broadcast in a first reception region, while the other graphics signal including the text portions in the second language is inserted into the television signal in order to obtain a second television transmission signal to be broadcast in the second reception region.

An output 124 of the circuit 120 for generating a control signal is associated with a control signal input 125 of the graphics memory 122 and with a control signal input 126 and 127, respectively, of the first and second text memories 118, 119. Of course, there are also other control lines (though not shown herein) for controlling the combining sub-circuits 114 and 115 and the sub-circuits 150 and 152.

A user can operate the apparatus through a control monitor 170, which may be, for example, a "touch-sensitive" screen. As an alternative, the apparatus may be operated through a keyboard (not shown) and a mouse (not shown).

Of course, when a match between the German national team and the Danish national team is to be broadcast, said match will also be broadcast in Denmark. As a rule, therefore, the apparatus is also equipped with a third text memory (not shown) for storing terms in the Danish language, a third combining sub-circuit, and a third sub-circuit for inserting graphics with text portions in Danish into the television signals.

The mode and principle of operation of said apparatus will now be described with reference to FIGS. 2 to 5.

Figure 2:
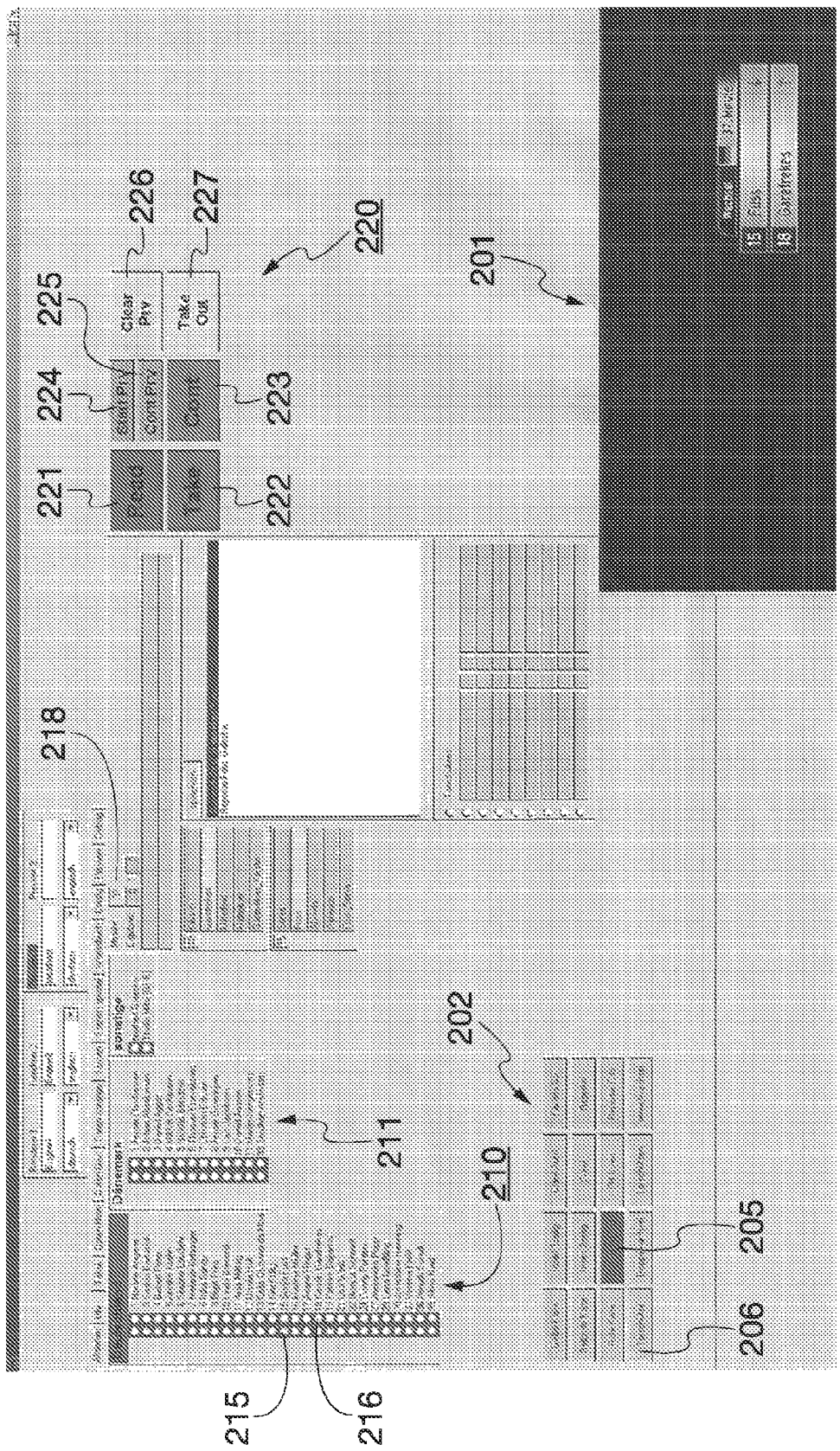
FIG. 2 shows a "screenshot" of the control monitor of said apparatus.

FIG. 2 shows a "screenshot" of the control monitor of said apparatus. In this particular case, it is a football match during which a player of the German national team is substituted at the $37^{th}$ minute. Reference numeral 201, shown in the lower right corner of the illustration, indicates the screen portion where the graphics to be inserted is displayed; it can be seen that the player Fuss, with jersey number 15, has been substituted with player Garefrekes with jersey number 18.

Reference numeral 202, in the lower left part of the image, indicates the buttons for selecting a certain graphic environment (template), in this case the graphic environment dedicated to player substitutions. This means that the button 205 ("substitution") has been selected. Likewise, in order to generate a graphics when a goal is scored, one will have to press the button 206.

In the upper left part of the image, reference numeral 210 indicates the Germany players. On the right, reference numeral 211 indicates the Denmark players.

Since there has been a substitution between the players Fuss and Garefrekes, the user of the apparatus has selected the box 215 in the (red) column on the left and the box 216 in the (green) column on the right. In the text field 218, the user can enter the time when the substitution has taken place, in this case the $37^{th}$ minute.

The upper right part of the image shows other control buttons of the device. More specifically, when the button 221 (READ, green) is pressed, the complete graphics signal will be created in the preview block 180 (FIG. 1), sent to the control monitor 170 via the line 181, and finally displayed in the screen portion 201. When the button 222 (TAKE, red) is pressed, the combining sub-units 114 and 115 will be controlled in a manner such as to generate the two complete graphics signals based on the data received via the respective inputs 130, 136, 139 and 132, 137, 142, and the two sub-circuits 150 and 152 will be controlled in a manner such that the graphics signals will be inserted into the television signal of the television source TVSRCE, and thus broadcast via the outputs 164/107 and 166/168.

The buttons 225 (Cont Pry) and 223 (CONT) are used for continuing the reading in the graphic animation. For example, by pressing the button 223 it is possible to remove both graphics signals. Or by pressing just once the button 223 it is possible to continue the reading in the graphic animation, as shown in FIG. 2. FIG. 2 shows the graphics before said continuation (prior to the actual substitution). As soon as the players are substituted, the rows with "15 Fuss" and "18 Garefrekes" will change position, so that the row "18 Garefrekes" will appear above the row "15 Fuss" in the graphics.

By pressing the button 224 "Start Prv", the graphic environment will be reproduced on the screen 170, in animated mode, as a preview, and by pressing the button 225 "Cont Pry" it will be possible to continue the reading in the graphic animation. By pressing the button 226 "Clear Prv", the preview will be removed from the screen 170. By pressing the button 227 "Take Out", the insertion of the graphics signals into the television signal will be cancelled.

The remaining parts of the screen of FIG. 2 are unimportant for understanding the principle of operation of the apparatus, and will not therefore be described any further.

Figure 3:
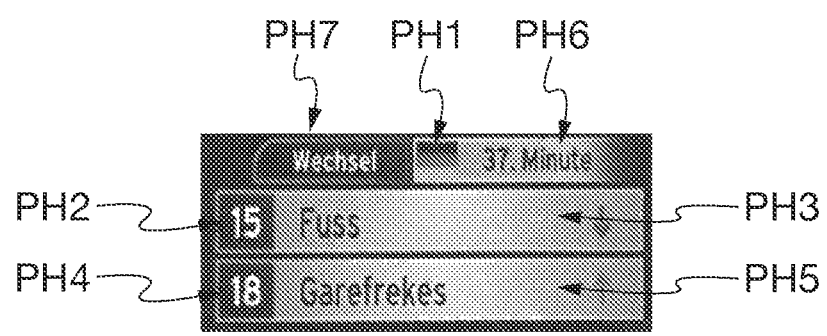
FIG. 3 shows the graphics integrated into the "screenshot" of FIG. 2.

The following will illustrate, with reference to FIG. 3, the generation of the graphics signals for the two languages. The memory 122 contains the graphic environments which are visible, in the example in question, through the gray and black boxes on the graphics background and the coloured arrows. The graphic environment also incorporates so-called "placeholders" (or windows) that can be filled with text or images. Once the user has acted upon he screen, in the controller 120 the "control sequence" (or control signal) will be generated for the graphics signal to be integrated into the television signal being broadcast in the German reception region (simplified representation):
PH1: Germany, PH2: 15, PH3: Fuss, PH4: 18, PH5: Garefrekes, PH6: 37. Minute, PH7: Wechsel Likewise, in the controller 120 the following "control sequence" (or control signal) will be generated for the graphics signal to be integrated into the television signal being broadcast in the British reception region (simplified representation):
PH1: Germany, PH2: 15, PH3: Fuss, PH4: 18, PH5: Garefrekes, PH6: 37', PH7: Substitution The placeholders PH1 to PH7 that precede the colons in the sequences are identification codes (ID) of the placeholders in the graphics, which is stored in the memory 122. This is because exactly this number of placeholders are needed for the substitution graphics.

The texts that follow the colons are texts that will have to be entered into appropriate placeholders. The identification code PH1 indicates a placeholder for an image in the graphic environment, where "Germany" is entered (this is the name of the image of the German flag: in black, red and gold colours). The name of said German flag is stored in the memory 128. Therefore, the controller 120 generates an address for the memory 128 to allow selecting a memory portion in said memory 128 and to allow a control signal for the flag to be issued through the output 145, which will be made available to the combining sub-units 114 and 115. Therefore, said combining sub-units 114 and 115, to which the controller 120 sends the above-mentioned control sequences, will know that the German flag must be inserted into the position PH1 in the graphic environment of both graphic signals.

The identification codes PH2 and PH4 indicate the placeholders, within the graphic environment, into which the jersey numbers (15 and 18) are to be entered. Jersey numbers are also stored in the memory 128 (since they are language-independent). The controller 120 then generates two addresses for the memory 128 to allow selecting, in the memory 128, those memory portions which store the jersey numbers, and to allow the two jersey numbers to be made available at the output 145 and then supplied to the combining sub-units 114 and 115. Therefore, the combining sub-units 114 and 115, to which the controller 120 also sends the above-mentioned control sequences, will know that the jersey number "15" must be loaded into the position PH2 and the jersey number "18" must be loaded into the position PH4 in the graphic environment.

The identification codes PH3 and PH5 indicate placeholders into which the players' names (Fuss and Garefrekes) are to be entered. The player names are also stored in the memory 128 (since they are language-independent). The controller 120 then generates two addresses for the memory 128 to allow selecting, in the memory 128, those memory portions which store the player names, and to allow the two players' names to be made available at the output 145 and then supplied to the combining sub-units 114 and 115. Therefore, the combining sub-units 114 and 115, to which the controller 120 also sends the above-mentioned control sequences, will know that the player name "Fuss" must be inserted into the position PH3 and the player name "Garefrekes" must be inserted into the position PH5 in the graphic environment.

The identification code PH6 indicates a placeholder in the graphics into which the time is to be entered. In German, this will be "37. Minute"; in English, it will be "3740 ". The time datum "37" has been entered into the field 218 (FIG. 2) and is offered to both combining sub-units 114 and 115 (not shown in FIG. 1). The time indication varies according to the language. Therefore, the memory 118 stores the German word "Minute" and the memory 119 stores the English designation for minutes, i.e., "'". The controller 120 then generates two addresses, one for the memory 118 and the other for the memory 119, to allow selecting the memory portion that contains the German word "Minute" in the memory 118 and the memory portion that contains the minute symbol "'" used in the English language in the memory 119, and to allow the two time indications to be made available at the outputs 140 and 141 and then supplied to the combining sub-units 114 and 115. Therefore, said combining sub-units 114 and 115, to which the controller 120 also sends the above-mentioned control sequences, will know that the time datum "37" must be loaded in both graphics into the position PH6, together with the time indications "Minute" and "'".

The identification code PH7 indicates a placeholder in the graphics into which the action taking place is to be entered. In German this will be "Wechsel"; in English, it will be "substitution". The action name varies according to the language. Therefore, the memory 118 stores the German word "Wechsel" and the memory 119 stores the English word "substitution". The controller 120 then generates two addresses, one for the memory 118 and the other for the memory 119, to allow selecting the memory portion that contains the German word "Wechsel" in the memory 118 and the memory portion that contains the English word "substitution" in the memory 119, and to allow the two words to be made available at the outputs 140 and 141 and then supplied to the combining sub-units 114 and 115. Therefore, said combining sub-units 114 and 115, to which the controller 120 also sends the above-mentioned control sequences, will know that the words "Wechsel" and "substitution" must be loaded into the position PH7.

When the button 221 in the upper right corner of the screen of FIG. 2 is pressed, the graphic environment stored in the memory 122 will be combined with the information indicated in the control sequences in the upper part of the screen, relating to the German and English languages. As far as the German language is concerned, the above translates into the graphics shown in the lower right part of the screen of FIG. 2. As to the English language, instead, the above translates into a similar graphics, which however contains some text parts in English.

By pressing the button 222 of FIG. 2, the composed graphic environments are made available by the combining sub-circuits 114 and 115—along with the key signals that determine where the graphic environments must be placed within the television image—to the sub-circuits 150 and 152, and said sub-circuits 150 and 152 are then controlled in a manner such that the two graphic environments will be inserted into the television signal.

Figure 4:
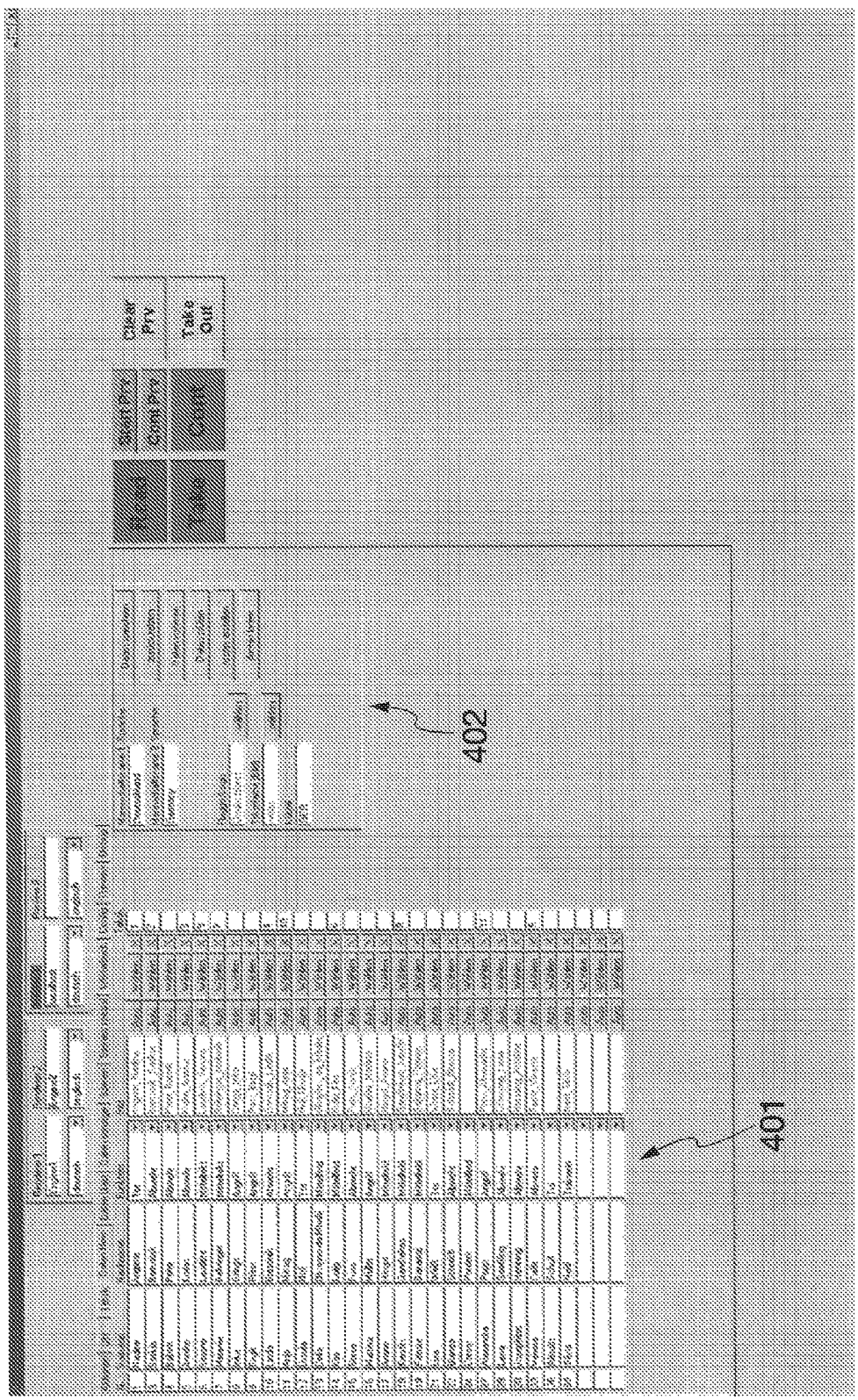
FIG. 4 shows a "screenshot" for entering a part of the data into the apparatus.

FIG. 4 shows a "screenshot" for entering a part of the data into the apparatus. FIG. 4 shows a sheet TAB, through which one can enter the names of the players of a team. Of course, this activity is carried out ex ante, i.e., long in advance of the actual match. In the left portion of the screen, reference numeral 401 indicates the text fields for entering the players' names and roles (goalkeeper, midfield, defence, etc.). By means of the buttons in the field 402 at the centre, said names can be saved into the memory 128. Likewise, a sheet TAB (not shown) allows entering the names and roles of the players of the other team. Also these names are saved into the memory 128. Similarly, there is another sheet TAB intended for "miscellaneous" people's data (e.g., referee, moderator, experts). The players' names and roles can be entered manually. Of course, such information may also be provided on an external data memory (e.g., USB memory stick). Therefore, said information can be loaded into the apparatus from said external data memory (as those skilled in the art will readily appreciate).

In turn, the players' roles are language-specific and are therefore stored into the memories 118 and 119. The above will be explained with reference to FIG. 5.

Figure 5:
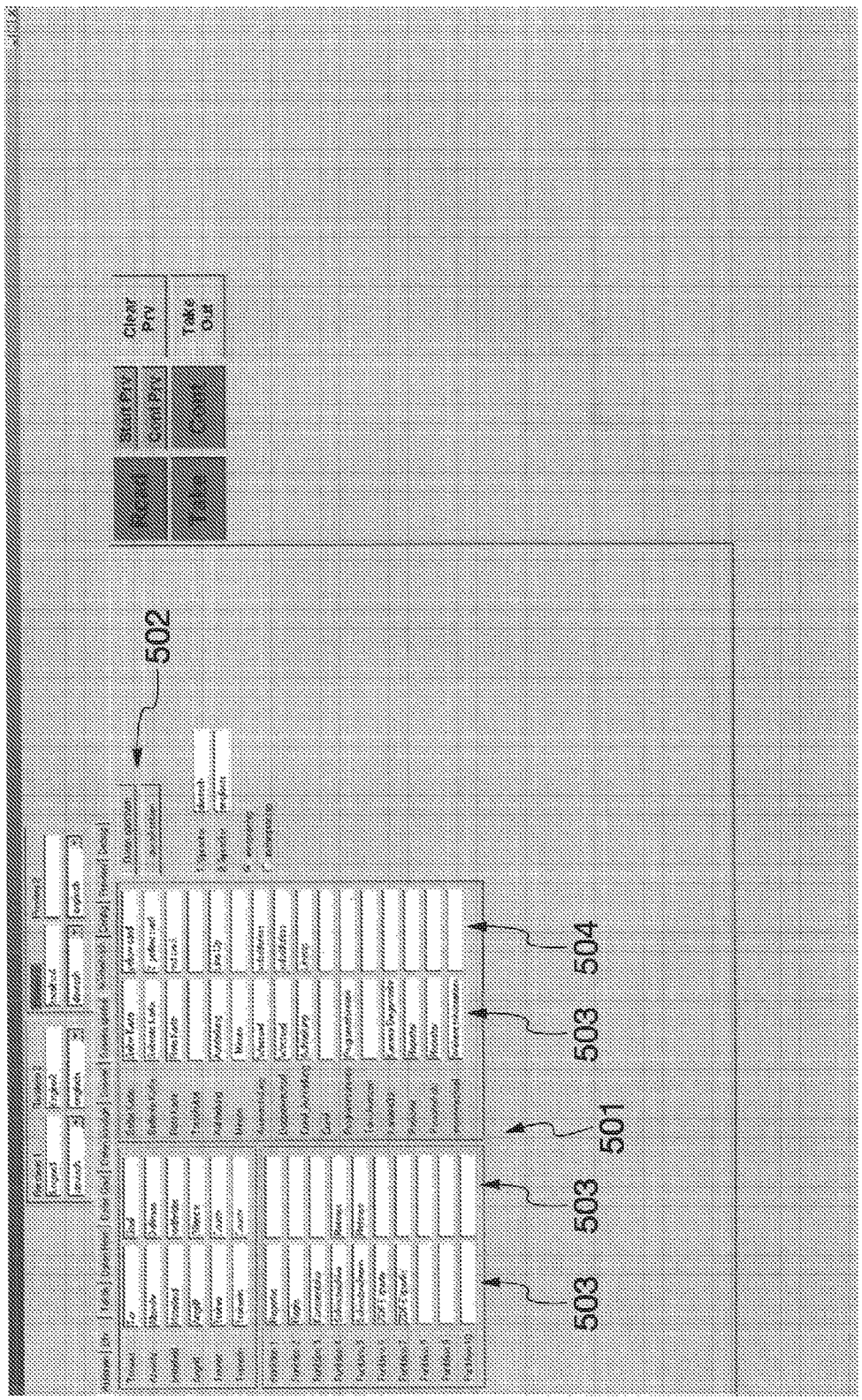
FIG. 5 shows a "screenshot" for entering language-specific data into the apparatus, FIG. 6 schematically shows a portion of a second example of embodiment of said apparatus, and FIG. 7 schematically shows a portion of a third example of embodiment of said apparatus.

FIG. 5 shows a sheet TAB, through which one can enter language-specific terms. De facto, a sort of dictionary is defined for this match. Of course, also this dictionary is created ex ante, i.e., before the match begins. In the left portion of the screen, reference numeral 501 indicates the text fields where the words in the different languages can be entered. For example:

"Tor" and "goal"
"Abwehr" and "defence"
. . .
. . . etc., i.e., the German terms in the text fields in the two left columns 503 and the corresponding English terms in the text fields in the two right columns 504.

By pressing the buttons 502, said words can be saved into the memories 118 and 119, the words shown in the left column 503 being stored into the memory 118 and the words shown in the right columns 504 being stored into the memory 119. It is also possible to save the addresses of all the corresponding words in German and English. This allows selecting a German word via its respective address in the memory 118 and, through the effect of the direct link to the equivalent English word, selecting said English word in the memory 119.

In this case as well, of course, said "dictionary" may be provided on an external data memory (e.g., USB memory stick). Therefore, said information can certainly be loaded into the apparatus from said external data memory (as those skilled in the art will readily appreciate).

Figure 6:
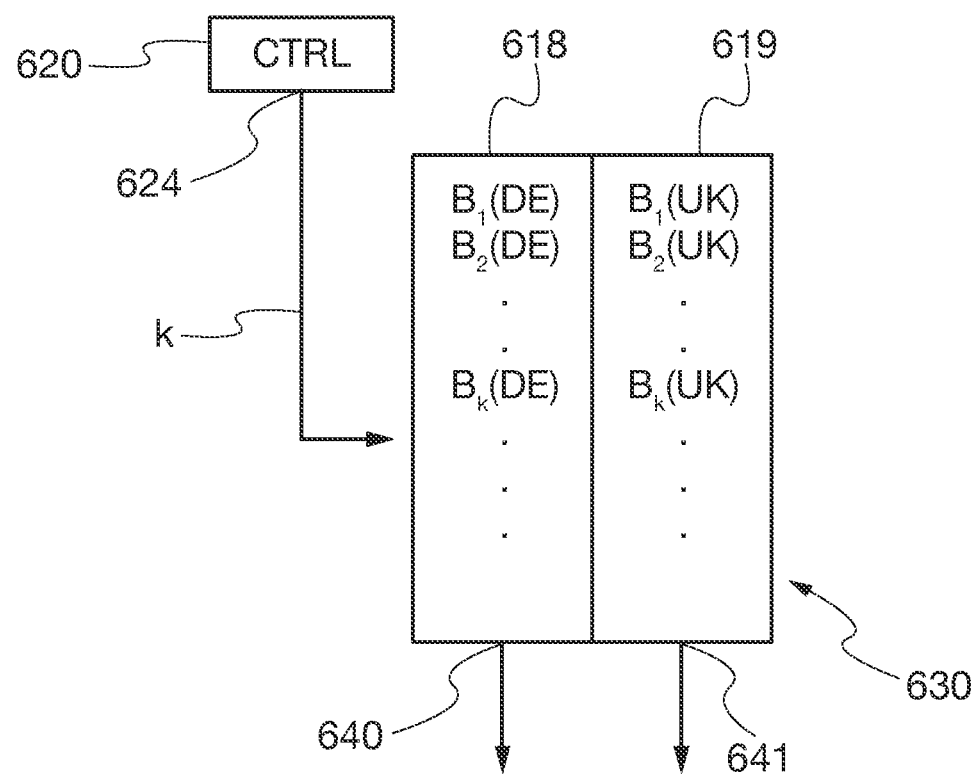

FIG. 6 illustrates another schematized example of embodiment of the apparatus proposed by the invention. In particular, FIG. 6 simply shows a further implementation variant of the memories 118 and 119 of FIG. 1, describing the principle of operation of such memories, designated by reference numerals 618 and 619 in FIG. 6, in combination with the controller 120 of FIG. 1 (620 in FIG. 6). In FIG. 1, the memories are indicated as separate memories. It is however possible to use a single memory 630, which, as far as saving language-specific text portions is concerned, is composed of two sub-memories 618 and 619. The different terms B1 (e.g. "Tor" [en.: goal], B2 (e.g., "Abwehr" [en.: defence]), . . . Bk (e.g., "gelbe Karte" [en.: yellow card]), . . . are stored in the sub-memories 618 and 619 in both German (B1(DE), B2(DE), . . . Bk(DE), . . . ) and English (B1(UK), B2(UK), . . . Bk(UK), . . . ). The addressing in the memory 630 by the controller 620 implies that an address k is generated at the output 624 of the controller 620, which is then offered to the memory 630. Said address k implies that the terms Bk(DE) and Bk(UK) are displayed in the memory 630 and made available at the outputs 640 and 641 of the memory 630.

Figure 7:
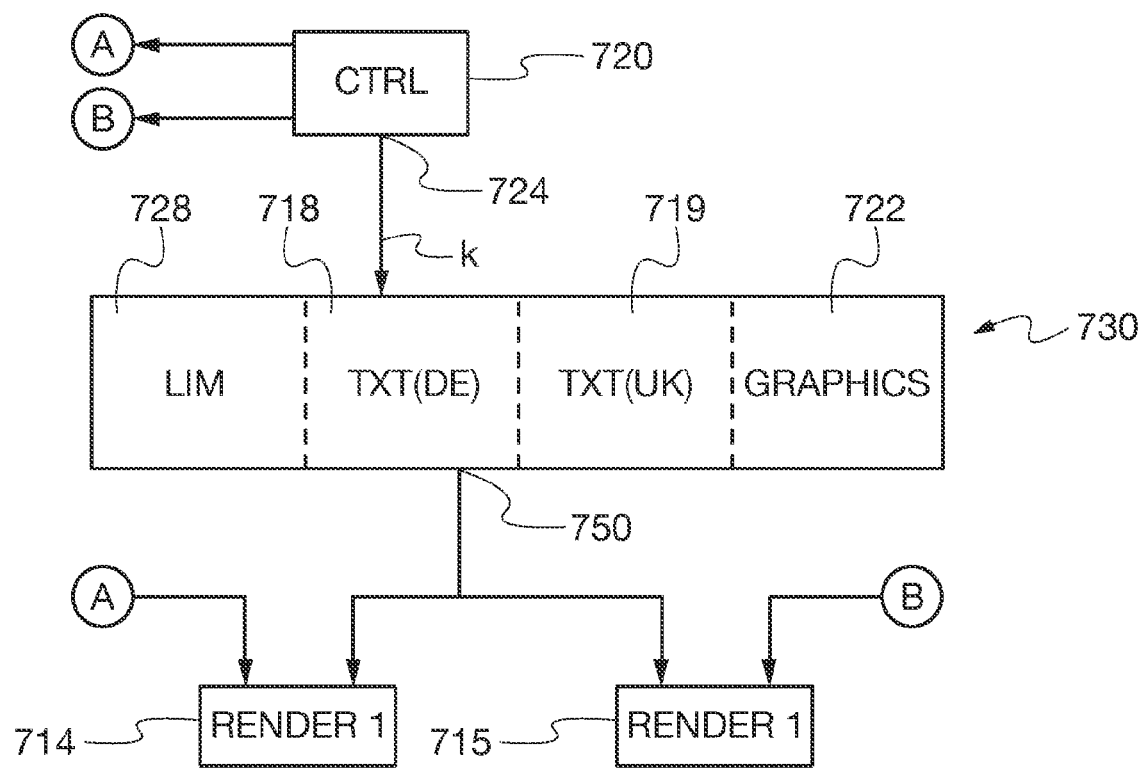

FIG. 7 illustrates another schematized example of embodiment of the apparatus proposed by the invention. In particular, FIG. 7 simply shows a further implementation variant of the memories 118, 119, 122 and 128 of FIG. 1, as well as the principle of operation of such memories of FIG. 7 in combination with the controller 120 of FIG. 1 (720 in FIG. 7) and with the combining sub-circuits 114 and 115 of FIGS. 1 (714 and 715 in FIG. 7). In FIG. 1, the memories are indicated as separate memories. It is however possible to use a single shared memory 730 storing all the data required for the generation of graphic signals. It follows that German words will be stored into the memory portion 718, English words in the memory portions 719, language-independent terms in the memory portion 728, and graphic environments (templates) in the memory portion 722.

The addressing of a term in the memory 730 by the controller 720 implies that an address k is generated at the output 724 of the controller 620, which is then offered to the memory 730. Said address k implies that a term stored in the memory 730 is displayed and made available at the output 750 of the memory 670. By way of example, the first "term" may be the graphic environment (template) relating to the substitution shown in FIGS. 2 and 3. Said graphic environment (template) will then appear at the output 750 and, upon a controller's command (via the control lines A and B), will be received by both combining sub-circuits 714 and 715.

The controller circuit 720 will then generate a subsequent address and will supply it to the memory 730. This second address is, for example, the address in the memory portion 728 where the player name "Fuss" is stored (see FIGS. 2 and 3). Said name is then made available at the output 750 of the memory 730 and offered to the combining sub-circuits 714 and 715. In this case as well, the player name "Fuss" will be received by both combining sub-circuits 714 and 715 upon a controller's command (via the control lines A and B).

The next address is, for example, the address of the player "Garefrekes" in the memory portion 728. This will cause the player name "Garefrekes" to be made available at the output 750 and offered to the combining sub-circuits 714 and 715. In this case as well, the player name "Garefrekes" will be received by both combining sub-circuits 714 and 715 upon a controller's command (via the control lines A and B).

The next address is, for example, the address that stores, in the memory portion 718, the time indication "Minute". The latter is then selected and made available at the output 750. In this case, the controller 720 will only generate one control signal via the line A for the combining sub-circuit 714. By so doing, the time indication "Minute" will then be received by the combining sub-circuit 714.

The next address is, for example, the address that stores, in the memory portion 719, the time indication "". The latter is then selected and made available at the output 750. In this case, the controller 720 will only generate one control signal via the line B for the combining sub-circuit 715. By so doing, the time indication "" will then be received by the combining sub-circuit 715.

The time datum "37" (see FIGS. 2 and 3) is directly offered by the controller 720, via the control lines A and B, to the combining sub-circuits 714 and 715.

In a similar manner, the German flag and the players' numbers are transmitted from the memory portion 728 to the combining sub-circuits 714 and 715. The two graphics (graphics signals) will then be generated in said combining sub-circuits 714 and 715 upon receiving a control signal from the controller 720 via the lines A and B.

It must be specified that the above-described invention is not limited to the examples of embodiment described herein. Several variations and modifications are possible with respect to the examples of embodiment described herein, without departing from the invention as set out in the claims. For example, the system may be scaled at will. This means that it is possible to control more than just two combining sub-circuits (renderers), i.e., three, four, . . . When an important football match (e.g., Champions League finals) is to be broadcast in many countries, one may incorporate other languages in addition to German and English, e.g., French, Spanish, etc.

In this way, as aforementioned, different signal types may be used as a television/video signal. The different steps of the method, described herein as implemented via a hardware solution, may of course also be carried out via software. The apparatus proposed by the present invention may also be used for other sports, or even for events not dealing with sport.

The invention claimed is:

1. An on-screen graphics apparatus for inserting graphics into a television signal, provided with
    an input for receiving the television signal,
    a graphics signal generator for supplying a graphics signal to an output,
    a circuit for inserting the graphics signal into the television signal,
    an output for supplying the television signal including the graphics signal,
    the circuit for inserting said graphics signal being provided with a first input associated with the input of said apparatus for receiving the television signal, a second input associated with the output of the graphics signal generator for receiving the graphics signal, and an output for supplying the television signal provided with the graphics signal, the output of said circuit being associated with the output of said apparatus,
    wherein the apparatus is adapted to insert graphics into the television signal to be broadcast in at least two reception regions having different languages,
    wherein the graphics to be inserted comprises at least one text portion, which differs for each of at least two different languages,
    wherein circuits are provided for integrating a text signal corresponding to the text portion into the graphics signal, wherein at least two text memories are provided, one for each one of the at least two different languages, for storing the text portions for each graphic in each one of the at least two different languages, wherein a circuit is provided for generating control signals, and wherein said apparatus is adapted to insert:
        the graphics including the text portion in a first language into the television signal in order to obtain a first television transmission signal to be broadcast in a first reception region, and
        the graphics including the text portion in the second language into the television signal in order to obtain a second television transmission signal to be broadcast in the second reception region,
    under the influence of the control signals generated by the control signal generator circuit,
    wherein a graphics memory is provided for storing a plurality of different graphics, that an output of the control signal generator circuit is associated with a control signal input of the graphics memory and with a control signal input of the at least first and second text memories, that at least a first and a second combining sub-circuits are provided, each one comprising a first input, both being coupled to an output of the graphics memory, and a second input, the second input of the first combining sub-circuit being associated with an output of the first text memory and the second input of the second combining sub-circuit being associated with an output of the second text memory, and the outputs of the first and second combining sub-circuits being associated with first and second outputs of the graphics signal generator for supplying the two graphics signals including the text portions in the two different languages.

2. The apparatus as claimed in claim 1, wherein the circuit for generating control signals is adapted to insert, in a substantially synchronous manner,
    the graphics including the text portion in a first language into the television signal in order to obtain a first television transmission signal to be broadcast in a first reception region, and
    the graphics including the text portion in the second language into the television signal in order to obtain a second television transmission signal to be broadcast in the second reception region,
    under the influence of the control signals generated by the control signal generator circuit.

3. The apparatus as claimed in claim 1, wherein the circuit is provided with at least a first and a second sub-circuits, each one comprising a first input, associated with the input of said circuit, and a second input, the second input of the first sub-circuit being associated with the second input of the circuit and the second input of the second sub-circuit being associated with a third input of the circuit, the third input being associated with the second output of the graphics signal generator, and the output of the first and second sub-circuits being associated with the first output and with a second output of the apparatus for supplying the first and the (at least) second television transmission signals.

4. The apparatus as claimed in claim 1, wherein the two text memories form part of a common memory.

5. A method for inserting graphics into a television signal, the graphics to be inserted comprising at least one text portion which is differentiated into the (at least) two different languages (TXT(DE),TXT(UK)), wherein said method is carried out by means of the apparatus as claimed in claim 1.

6. The apparatus as claimed in claim 2, wherein a graphics memory is provided for storing a plurality of different graphics, that an output of the control signal generator circuit is associated with a control signal input of the graphics memory and with a control signal input of the first and second text memories, that at least a first and a second combining sub-circuits are provided, each one comprising a first input, both of the latter being associated with an output of the graphics memory, and a second input, the second input of the first combining sub-circuit being associated with an output of the first text memory and the second input of the second combining sub-circuit being associated with an output of the second text memory, and the outputs of the first and second combining sub-circuits being associated with first and second outputs of the graphics signal generator for supplying the (at least) two graphics signals including the text portions in the (at least) two different languages.

7. The apparatus as claimed in claim 1, wherein a graphics memory is provided for storing a plurality of different graphics, that an output of the control signal generator circuit is associated with a control signal input of the graphics memory and with a control signal input of the first and second text memories, that at least a first and a second combining sub-circuits are provided, each one comprising a first input, both of the latter being associated with an output of the graphics memory, and a second input, the second input of the first combining sub-circuit being associated with an output of the first text memory and the second input of the second combining sub-circuit being associated with an output of the second text memory, and the outputs of the first and second combining sub-circuits being associated with first and second outputs of the graphics signal generator for supplying the (at least) two graphics signals including the text portions in the (at least) two different languages.

\* \* \* \* \*